Patented June 12, 1951

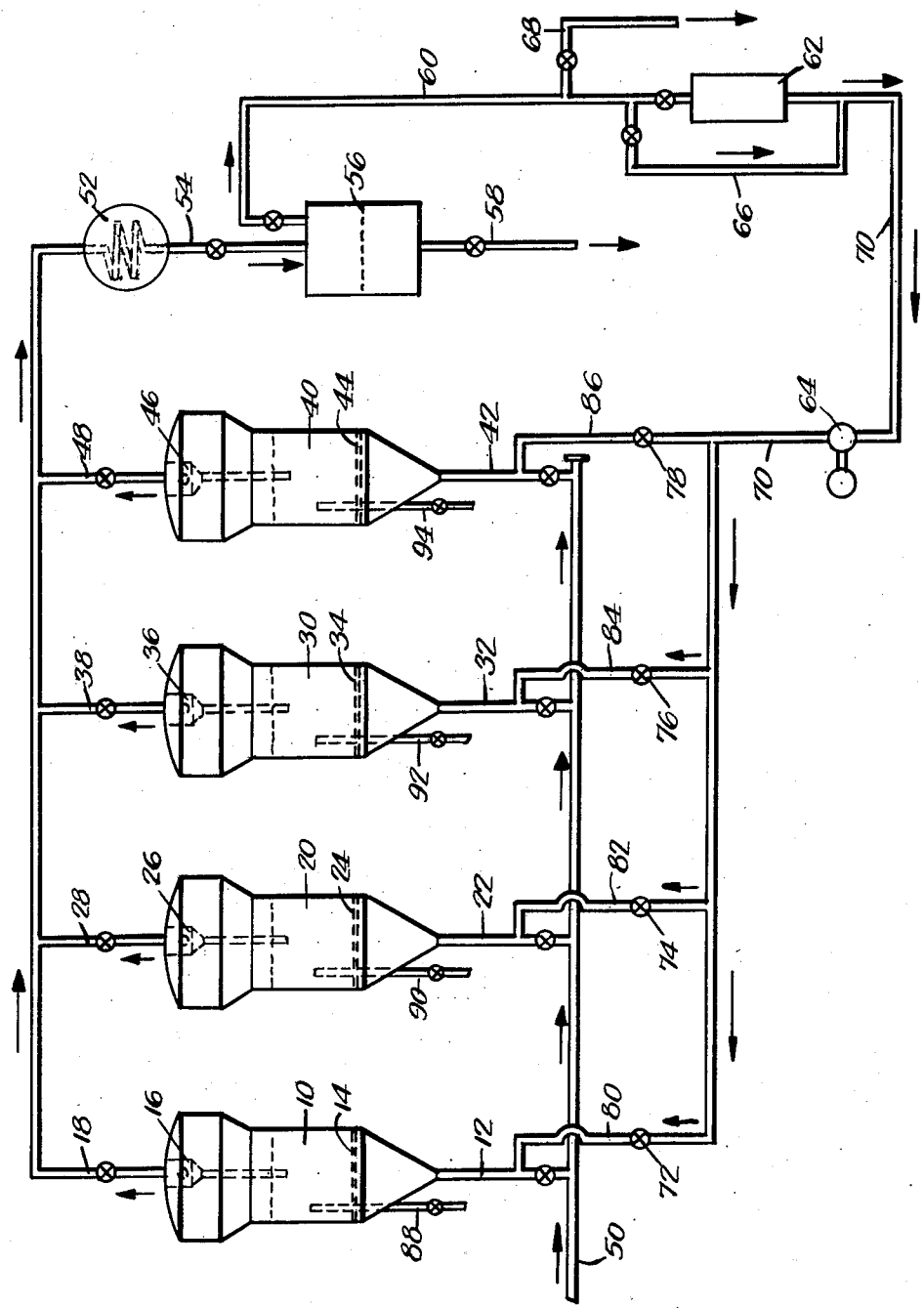

2,556,861

UNITED STATES PATENT OFFICE 2,556,861

HYDROCARBON SYNTHESIS PLANT

Alexis Voorhies, Jr., Baton Rouge, and Robert W. Krebs, East Baton Rouge, La., assignors to Standard Oil Development Company, a corporation of Delaware Application September 15, 1948, Serial No. 49,426

7 Claims. (Cl. 260—449.6)

The present invention relates to the synthesis of hydrocarbons from carbon oxides and hydrogen in the presence of suitable catalysts. The invention relates more particularly to a process for obtaining high yields of normally liquid hydrocarbons boiling within the gasoline and Diesel oil range and concomitantly retarding excessive catalyst fouling and disintegration.

The synthesis of hydrocarbons and other valuable products from gas mixtures containing various proportions of hydrogen and carbon oxides, particularly carbon monoxide, both in fixed bed as well as in dense phase fluid catalyst operation is well known in the art. The character and quality of the synthesis product depends largely on the temperatures, pressures, $H_2/CO$ ratios of the feed gas, and the nature of the catalyst used, the latter being usually an iron group metal catalyst promoted with such promoters as various alkali metal compounds, rare earth metal oxides, magnesia, alumina, etc., in amounts of about 0.5–10%. Thus cobalt catalysts promoted with thoria and/or magnesia have been used at relatively low pressures of about 15–75 p. s. i. g. and relatively low temperatures of about 350–450° F. and high $H_2/CO$ ratio of 2 or more to produce a substantially saturated hydrocarbon material from which valuable Diesel fuels, lubricating oils and waxes may be obtained. Iron-type catalysts, usually promoted with a suitable alkali metal compound, such as carbonates, halides, etc. of potassium or sodium may be used in combination with relatively high pressures, up to 600–700 p. s. i. g. and temperatures of 450°–750° F., and lower $H_2/CO$ ratios generally not above 2, to produce predominantly unsaturated material from which large proportions of high octane motor fuels may be recovered.

While it has thus been possible to obtain high octane motor fuels in good yields by this process, it has also been found that operations under conditions that favor good yields of useful (i. e. $C_4+$ oil) products are accompanied by excessive deposition of carbon and carbonaceous material upon the catalyst. This carbon deposition is a serious problem, particularly when the catalytic operation is carried out by the fluid catalyst technique, which latter, because of better heat distribution, transfer and control and because of the more intimate mixing and contact of the catalyst with the reactants, is considered far superior to fixed bed processes for effecting the catalytic synthesis of hydrocarbons. However, two problems that arise in conjunction with the fluid solids type of operation are the fouling of the catalyst by carbon deposition, and the tendency of catalyst particles to disintegrate, as a result of the carbon formation and deposition. Carbon deposition and catalyst disintegration not only cut down product yield through poor fluidization of the catalyst, excessive fines formation and agglomeration, but may produce conditions requiring shut down of the plant.

It has heretofore been found that the tendency for carbonaceous material to deposit on the catalyst and for catalysts to disintegrate, may be related to the age of the catalyst and to certain operating variables. Thus it is known that relatively fresh synthesis catalyst tends to deposit carbon at a substantially higher rate than catalyst that has been resident in the system for a relatively larger period of time. It is also known that the carbon formation tendencies and characteristics of a catalyst can be controlled and minimized to a considerable extent by increasing the partial pressure of the hydrogen fed to the hydrocarbon synthesis zone. Thus, typical experimental data have shown that, at a hydrogen partial pressure of about 150 p. s. i., an iron synthesis catalyst, such as an alkali metal promoted pyrites ash catalyst, will yield, when it has an average age, or residence time under synthesis conditions of 50 hours, about 1.5 grams of carbon/m³ $H_2+CO$ consumed. When the average catalyst age has increased to 200 hours the carbon figure drops to about 0.8. If the catalyst age for the same catalyst averages 1000 hours, the rate of carbon formation drops to about 0.4 gram. Again, for a given age catalyst, as it has been pointed out, the rate of carbon formation decreases with increase in hydrogen partial pressure in the system. Thus, at a catalyst age averaging 50 hours under synthesis conditions, and operating under a hydrogen partial pressure of about 100 p. s. i. in the synthesis reactor, carbon was deposited at the rate of about 4.3 grams per cubic meter of $H_2+CO$ consumed. Operating at 180 p. s. i. reduced this figure to 1.0 grams, and at 240 p. s. i. to about 0.5 gram.

Unfortunately, desirable as it is to keep carbon formation at a low rate it has been found hitherto, in general, that those factors favoring low rate of carbon formation also tend to keep down the yields of useful synthesis products and, conversely, those operating conditions which favor high yields of $C_4+$ hydrocarbons also favor formation of excessive amounts of carbon. Thus, as indicated, when the hydrogen partial pressure in the synthesis feed gas is increased to, say above 200 p. s. i., by raising the ratio of hydrogen in the feed, the selectivity to liquid hydrocarbons of the gasoline range is generally low. Similarly, if as a result of feeding fresh feed and recycle tail gas, the ratio of hydrogen to the total water gas constituents of the gas feed, or $H_2/H_2+CO+CO_2$ ratio, is low, the selectivity to useful products is high, but the rate of carbon formation also is excessive. Again, as has been pointed out, fresh catalyst is highly reactive, but tends to form large quantities of carbon whereas, under the same reaction conditions, aged catalyst produces less carbon but also less $C_4+$ oil.

It is, therefore, the principal object of the present invention to provide an improved process for the conversion of CO and $H_2$ to form high yields of normally liquid hydrocarbons without forming excessive amounts of carbon during the conversion and without excessive fragmentation of the catalyst.

Another object of the invention is to provide means for increasing the flexibility of this process with respect to the increasing age of the catalyst.

Other objects and advantages will appear hereinafter.

It has now been found that high yields of useful synthesis products unaccompanied by excessive carbon formation and catalyst disintegration may be obtained by operating a hydrocarbon synthesis plant comprising a plurality of synthesis reactors, in such a manner that the composition of the feed gas to each fluid catalyst synthesis reactor is advantageously adjusted to the average age of the catalyst within said reactor. This is accomplished by operating a plurality of fluid synthesis reactors in parallel, each reactor being charged with catalyst of different average age, combining product and unreacted gases, and adjusting the recycle ratio of tail gas to fresh feed individually to each reactor in such a manner that high $C_4+$ yields are obtained in each reactor without excessive carbon formation and catalyst fragmentation, and maintaining the overall recycle ratio for the plant substantially constant. It is known that the total feed to the synthesis reactor, that is, the combined fresh feed and recycles stream, becomes more carbon forming as the recycle ratio is increased. This is due to the decrease in hydrogen partial pressure in the reactor resulting from the interaction of hydrogen present in the fresh feed and in the tail gas with the carbon dioxide formed in the synthesis reactor and recycled as a constituent of the tail gas and also to the increased dilution with methane and other constituents of the recycle gas. As this recycle ratio is increased, therefore, the selectivity to desirable hydrocarbon in the synthesis reactor also increases, due to this decrease in the partial pressure of hydrogen and the increase in the partial pressure of carbon dioxide.

In accordance with this invention, therefore, a plurality of hydrocarbon synthesis reactors are operated with catalyst of increasing age, starting with relatively fresh catalyst. The recycle to fresh feed ratio to each reactor is so adjusted with respect to the catalyst age therein that maximum quantities of $C_4+$ hydrocarbons and minimum carbon formation occurs in each, as described more fully below. Thus to the reactor containing the newest (i. e., most active) catalyst, the recycle to fresh feed ratio is lowest, in order to maintain a high hydrogen partial pressure. However, because of the activity of such fresh catalyst, even under this high hydrogen partial pressure, reasonably high yields of $C_4+$ products are obtained. On the other hand, the recycle/fresh feed ratio is highest to the most aged catalyst, since the carbon formation tendencies of the latter are low, and therefore a low hydrogen partial pressure or a low ratio of $$H_2/H_2+CO+CO_2$$

may be tolerated in such reactors without excessive carbon formation. Such low ratios have the highest selectivities of $C_4+$ oils. The recycle ratios to the intermediate reactors are so scheduled that the overall recycle ratio to the plant is constant. Such ratio is usually determined by the compressor capacity of the system.

Having set forth the general nature, advantages, and objects of the invention, the latter will best be understood from the more detailed description hereinafter, in which reference will be made to the accompanying drawing which is a diagrammatic representation of a system suitable for carrying out a preferred embodiment of the invention.

Referring now in detail to the drawing, 10, 20, 30, and 40 represent synthesis reactors preferably in the form of vertical cylinders having lower conical sections and upper expanded sections. Fresh feed gas mixture comprising $H_2$ and CO in the ratio of about 1.0 to 2.0 mols $H_2$ per mol CO is fed, for example, at the rate of about 100 million standard cubic feet per day, through line 50 and is introduced into reactors 10, 20, 30 and 40 through lines 12, 22, 32 and 42 respectively, and flows upwardly through screens or grids 14, 24, 34 and 44 to effect good gas distribution. Also introduced into the synthesis reactors is recycle gas, as described more fully below.

The reactors contain a finely divided iron group metal catalyst, preferably an iron-type catalyst having a particle size range of about 10–200 microns, preferably 20–100 microns. The catalyst is fluidized by the upflowing gasiform reactants and reaction products to form a dense highly turbulent mass, having a well-defined upper level and an apparent density of about 30–150 lbs./cu. ft., depending on fluidization conditions. Superficial linear gas velocities of about 0.3 to 1.5 feet per second are suitable for proper fluidization of the type of catalyst employed, which may be sintered reduced pyrites ash, or ammonia synthesis catalyst or the like, preferably promoted with 0.5–1.5% $K_2CO_3$. These linear velocities may be maintained at the same rate for each reactor, or they may be varied in accordance with the age of the catalyst as detailed below.

The catalyst is so arranged in the reactor that the catalyst in reactors 10, 20, 30 and 40 have had an average age or number of hours under synthesis conditions, for instance of 350, 1050, 1750 and 2450 hours respectively.

Within the reactors the total pressure is adjusted to about 250 to 750 p. s. i. g., and suitable temperatures of about 550 to 750° F. are maintained by any conventional cooling means, such as cooling coils.

Gasiform reaction products are withdrawn overhead from the reactors through gas-solid separators, such as cyclones 16, 26, 36, and 46, and through lines 18, 28, 38 and 48 respectively, cooled in cooler 52, and passed through line 54 to a liquid-gas separator 56. Water and oil are withdrawn downwardly from separator 56 through line 58 to be further treated by conventional separation and product recovery means (not shown).

Tail gas is passed overhead from separator 56 through line 60. It may, if desired, be passed through caustic scrubber 62, for adjustment of its carbon dioxide content, before being passed to recycle pump 64, or it may by-pass scrubber 62 and be passed directly to pump 64, through by-pass line 66. Also, if desired, a portion of the tail gas may be removed from the system through line 68. From recycle pump 64 the tail gas is pumped through line 70 say at the rate of about 200 million standard cubic feet per day, to the reactors as recycle gas. Valves 72, 74, 76 and 78 are so adjusted that the ratio of recycle to fresh feed is proportioned in accordance with the age of the catalyst within the respective reactors. Recycle tail gas enters the respective reactor feed inlet lines through lines 80, 82, 84 and 86 respectively. Thus the tail gas, which may have a composition of $H_2/CO/CO_2$ of about 1.5:0.1:1 is recycled through line 80 to reactor 10 which contains the newest and most active catalyst in the ratio of about 0 to 1 part recycle to 1 part fresh feed. This recycle ratio not only sets, for a given quantity of catalyst, the linear inlet velocity but also the ratio of $H_2/H_2+CO_2+CO$, which may be here about 0.5–0.7, a relatively high value, but which prevents high rate of carbon deposition within reactor 10. On the other hand, valve 78 may be so adjusted that the ratio of recycle to fresh feed entering reactor 40 through lines 86 and 42 is about 2 to 6, affording a high superficial inlet velocity in reactor 40 and an $$H_2/H_2+CO+CO_2$$

ratio in the feed gas of 0.2 to 0.6, under which conditions high $C_4+$ selectivities are favored. Intermediate reactors 20 and 30 are provided with recycle/fresh feed ratio of intermediate values, such as 0.2 to 3 and 0.5 to 5, respectively. The total overall recycle ratio to the plant, however, is determined by the capacity of recycle pump 64 and may be 0.3 to 3.

The invention admits of numerous modifications obvious to those skilled in the art. Thus it may be desirable to vary the temperature levels maintained in the reactors, with reactors containing more aged catalysts being at higher temperature levels than those containing newer catalysts. Catalysts may be withdrawn from reactors 10, 20, 30 and 40 as desired through lines 88, 90, 92 and 94. The reactors need not all be of the same volume, but it may be advantageous for the reactors containing the more aged catalysts to have larger volumes than the others, so that they may contain more catalyst. In such case, the reactor receiving the fresh catalyst would always be the smallest vessel and would operate at lowest recycle ratio. It may be desirable, depending upon the circumstances, to carry out the operation by maintaining a given conversion level in each reactor, or to make the recycle to fresh feed adjustment to operate at a given rate of carbon formation. Also, as catalyst ages to an extent that satisfactory conversions, even at the high recycle ratios, are no longer obtained, it may be discarded or regenerated, and the cycle continued by replacing the discarded catalyst with fresh catalyst, and the recycle ratios readjusted all along the line accordingly. Also, any number of reactors may be employed.

Therefore, in accordance with the above invention wherein by means of adjusting the recycle ratios to a plurality of synthesis reactors in accordance with the age of the catalyst therein, so that operation is maintained within the reactors at as low a hydrogen partial pressure as is consistent with a reasonable amount of carbon formation, a process has been described wherein good yields of valuable synthesis products are obtained while unaccompanied by excessive carbon formation and fluid catalyst disintegration.

The invention may be further illustrated by the following example.

In a synthesis operation using an iron catalyst at 650° F. the composition of the fresh feed (synthesis gas) and the dry exit gas used for recycle had the following compositions in mol percent:

|  | Fresh Feed Gas | Recycle Gas |
|---|---|---|
| $H_2$ | 57.6 | 37.0 |
| CO | 38.2 | 8.4 |
| $CO_2$ | 0.6 | 31.5 |

The plant was operated in such a manner that 2½ parts of exit gas was recycled for every one part of fresh feed, giving a mixed feed containing 53% $H_2$. Inasmuch as the synthesis section was operated at 400 p. s. i. g. pressure, the partial pressure of $H_2$ was about 180 p. s. i. In a plant consisting of four reactors containing catalyst of varying ages, if the catalyst is used for a total of 2800 hours before being discarded and the charging of the four reactors is so scheduled that one reactor is being charged every 700 hours, the arithmetic average age of catalyst in the four reactors would be 350, 1050, 1750 and 2450 hours, respectively. In order to adjust carbon formation and disintegration tendencies to be equal in each reaction vessel and thereby to hold the overall carbon formation for a given overall yield to a minimum, it is necessary to operate with catalyst of the above named ages at $H_2$ partial pressures of 215, 191, 175 and 168 p. s. i., respectively. In order to obtain these $H_2$ partial pressures with gases having the compositions given above, it is necessary to use recycle ratios to the four reactors of 0.4, 1.3, 3.0 and 5.0, respectively. The above figures are recapitulated in the following tabulation. Also included are other quantities to be mentioned below:

| Reactor | Average Age, Hrs. | $H_2$ Partial Pressure | Recycle Ratios | Gas Vel., ft./sec. | $H_2/H_2+CO+CO_2$ |
|---|---|---|---|---|---|
| A | 350 | 215 | 0.4 | 0.35 | 0.57 |
| B | 1,050 | 191 | 1.3 | 0.6 | 0.54 |
| C | 1,750 | 175 | 3.0 | 1.0 | 0.52 |
| D | 2,450 | 168 | 5.0 | 1.5 | 0.50 |

If the four reactors are of the same diameter and the diameters are set to operate with a minimum velocity of 0.35 ft./sec. in the "A" reactor, it will be seen from the above tabulation that if an equal quantity of fresh feed is fed to each reactor the velocity to the "D" reactor, having the highest quantity of recycle gas, will be 1.5 ft./sec. It is known in the art that these two extremes, 0.35 and 1.5 ft./sec., are both within the workable range. The last column in the above tabulation shows the fraction of $H_2$ in the water gas constituents of the total, mixed feed gas. This ratio combined with the catalyst age is important in fixing the selectivity or yield of heavier hydrocarbons per unit of gas consumed. It will be seen that in the above operations this quantity does not vary widely and that where the quantity is highest (conducive to lowest selectivity) the catalyst is freshest and will therefore tend to compensate for the less favorable gas composition. Furthermore the composition most conducive to good selectivities is fed to the catalyst having the greatest age where excessive carbon formation and wax formation commonly associated with feed gases low in $H_2$ content are least apt to occur.

What is claimed is:

1. An improved process for producing high yields of valuable conversion products from $H_2$ and CO in a fluid catalyst hydrocarbon synthesis process without causing excessive deposition of carbonaceous material which comprises passing fresh synthesis gas in the ratio of about 1 to 2 mols of hydrogen per mol of carbon monoxide simultaneously into a plurality of hydrocarbon synthesis reaction zones, maintaining in said zones dense fluidized beds of iron-type catalyst, maintaining in said hydrocarbon synthesis zones, catalysts of age such that the average catalyst age in any one zone differs from that in any other zone and wherein the catalyst in one of said zones is relatively fresh, maintaining a total pressure in each of said zones in the range of about 250 to 750 pounds, withdrawing product comprising tail gases from said zones, combining said tail gases, recycling at least a portion of said tail gas separately to each of said synthesis zones, the ratio of recycle tail gas to fresh feed to the synthesis zone containing the freshest catalyst being substantially lower than the ratio of recycle tail gas to fresh feed supplied to the synthesis zone containing the most aged catalyst, which last-named ratio is also higher than the ratio of recycle to fresh feed fed to synthesis zones containing catalyst of intermediate age, which ratios in turn are higher than the recycle to fresh feed ratio to said zone containing the freshest synthesis catalyst, whereby the hydrogen partial pressures and the $H_2/H_2+CO+CO_2$ ratios in each of said zones is maintained responsive to the catalyst age in said zone and whereby high yields of valuable conversion products and low quantities of carbon within said respective synthesis zones are formed.

2. The process of claim 1 wherein the total pressure in each of said zones is about 400 p. s. i. g.

3. The process of claim 1 wherein the temperatures maintained within said respective synthesis zones increases with, and is a direct function of, the catalyst age.

4. The process of claim 1 wherein the recycle ratio increases by steps as the catalyst ages.

5. The process of claim 1 wherein the overall ratio of recycle tail gas to the fresh feed remains substantially constant.

6. The process of claim 1 wherein the ratio of recycle to fresh feed to the synthesis zone containing the newest catalyst is in the range of 0.2 to 1.0.

7. The process of claim 1 wherein the ratio of recycle to fresh feed to the synthesis zone containing the most aged catalyst is in the range of 1.0 to 5.0.

ALEXIS VOORHIES, JR.
ROBERT W. KREBS.

REFERENCES CITED

The following references are of record in the file of this patent:

UNITED STATES PATENTS

| Number | Name | Date |
|---|---|---|
| 2,271,259 | Herbert | Jan. 27, 1942 |
| 2,347,682 | Gunness | May 2, 1944 |
| 2,451,879 | Scharmann | Oct. 19, 1948 |
| 2,467,803 | Herbst | Apr. 19, 1949 |